(12) United States Patent
Nithyanandhan et al.

(10) Patent No.: US 11,078,415 B2
(45) Date of Patent: Aug. 3, 2021

(54) LANTHANUM BASED UPCONVERTING MICRORODS AND APPLICATION THEREOF

(71) Applicant: COUNCIL OF SCIENTIFIC AND INDUSTRIAL RESEARCH, Delhi (IN)

(72) Inventors: Jayaraj Nithyanandhan, Pune (IN); Kadhiravan Shanmuganathan, Pune (IN); Alagumalai Ananthan, Pune (IN)

(73) Assignee: COUNCIL OF SCIENTIFIC & INDUSTRIAL RESEARCH, Delhi (IN)

( * ) Notice: Subject to any disclaimer, the term of this patent is extended or adjusted under 35 U.S.C. 154(b) by 341 days.

(21) Appl. No.: 16/072,104

(22) PCT Filed: Jan. 20, 2017

(86) PCT No.: PCT/IN2017/050030
§ 371 (c)(1),
(2) Date: Jul. 23, 2018

(87) PCT Pub. No.: WO2017/125951
PCT Pub. Date: Jul. 27, 2017

(65) Prior Publication Data
US 2019/0040315 A1 Feb. 7, 2019

(30) Foreign Application Priority Data
Jan. 22, 2016 (IN) .............................. 201611002383

(51) Int. Cl.
*C09K 11/77* (2006.01)
*C01F 17/36* (2020.01)
(Continued)

(52) U.S. Cl.
CPC .......... *C09K 11/7773* (2013.01); *C01F 17/36* (2020.01); *C09K 11/025* (2013.01);
(Continued)

(58) Field of Classification Search
CPC ................................................... C09K 11/7773
See application file for complete search history.

(56) References Cited

U.S. PATENT DOCUMENTS

2007/0062411 A1　3/2007　Weisman et al.
2009/0042314 A1　2/2009　Capobianco et al.
(Continued)

FOREIGN PATENT DOCUMENTS

WO　2009/046392 A1　4/2009
WO　2012/091778 A2　7/2012

OTHER PUBLICATIONS

Gao. Yb3+/Er3+ codoped b-NaYF4 microrods: Synthesis and tuning of multicolor upconversion. Journal of Alloys and Compounds vol. 554, Mar. 25, 2013, pp. 395-399 (Year: 2013).*

*Primary Examiner* — Matthew E. Hoban
(74) *Attorney, Agent, or Firm* — BakerHostetler

(57) ABSTRACT

The present invention provides a monodispersed lanthanum based upconverting microrods comprising $\beta\text{-NaYF}_4\text{:Yb}^{3+}$, $\text{Er}^{3+}$ and $\beta\text{-NaYF}_4\text{:Yb}^{3+}$, $\text{Tm}^{3+}$, capped with oleic acid. The upconverting microrods, embedded in polymer matrices is used for making security tags and for sensing application. The process of preparation of the oleic acid capped upconverting microrods is also disclosed.

5 Claims, 8 Drawing Sheets

(51) Int. Cl.
  *C09K 11/02* (2006.01)
  *B82Y 15/00* (2011.01)
  *B82Y 20/00* (2011.01)
  *B82Y 30/00* (2011.01)
  *B82Y 40/00* (2011.01)

(52) U.S. Cl.
  CPC ............... *B82Y 15/00* (2013.01); *B82Y 20/00* (2013.01); *B82Y 30/00* (2013.01); *B82Y 40/00* (2013.01); *C01P 2002/72* (2013.01); *C01P 2004/04* (2013.01); *C01P 2004/16* (2013.01); *C01P 2004/54* (2013.01); *C01P 2004/62* (2013.01)

(56) References Cited

U.S. PATENT DOCUMENTS

| | | | |
|---|---|---|---|
| 2009/0121189 A1* | 5/2009 | Ju | C09K 11/7773 252/301.6 R |
| 2013/0320263 A1 | 12/2013 | Riman et al. | |
| 2014/0261031 A1 | 9/2014 | Kellar et al. | |
| 2014/0273246 A1* | 9/2014 | Bisso | G01N 21/6428 436/56 |

* cited by examiner

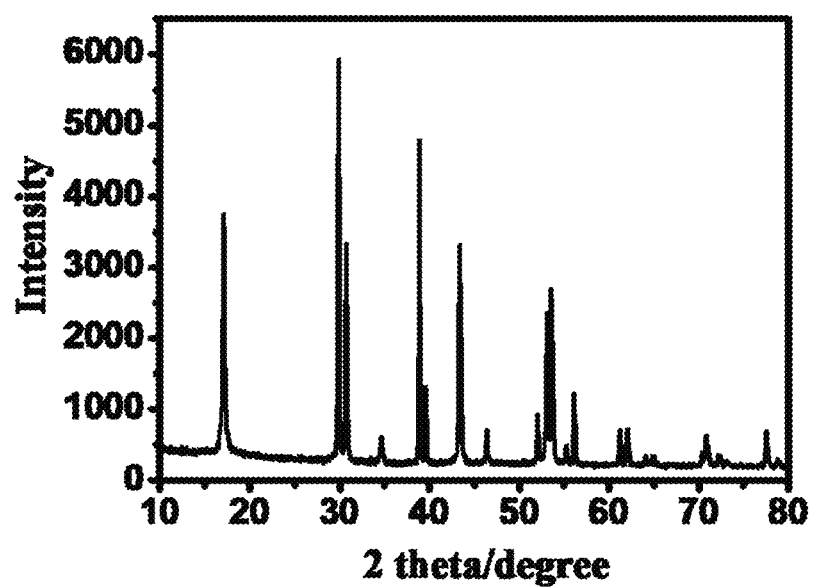
Figure: 1

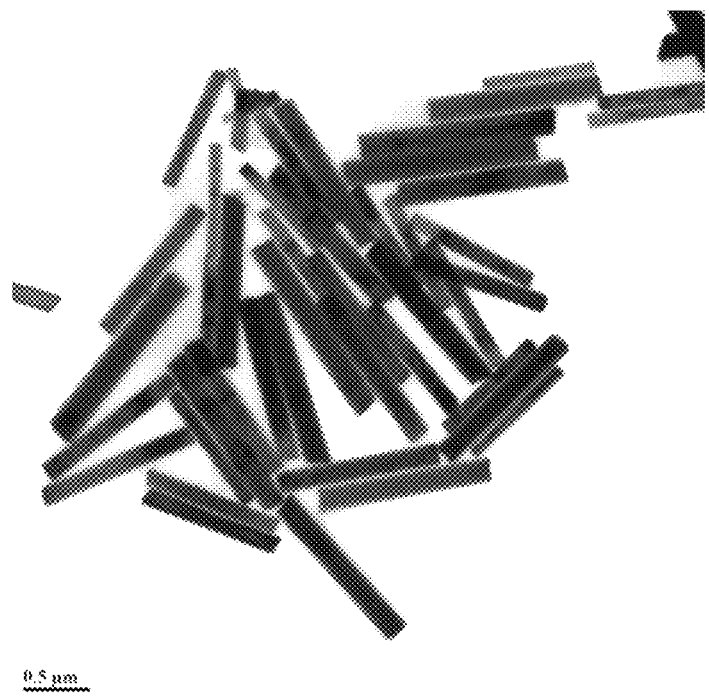
Figure: 2

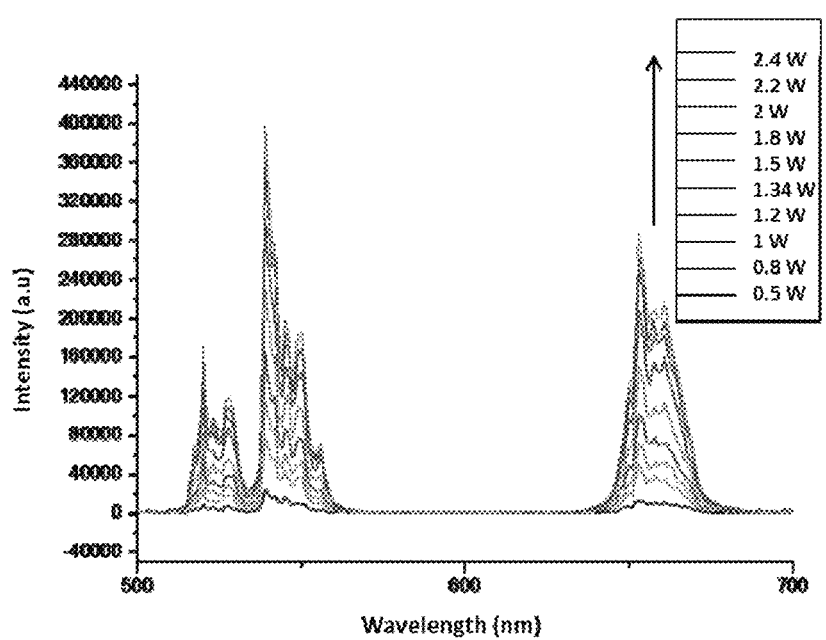
Figure: 3

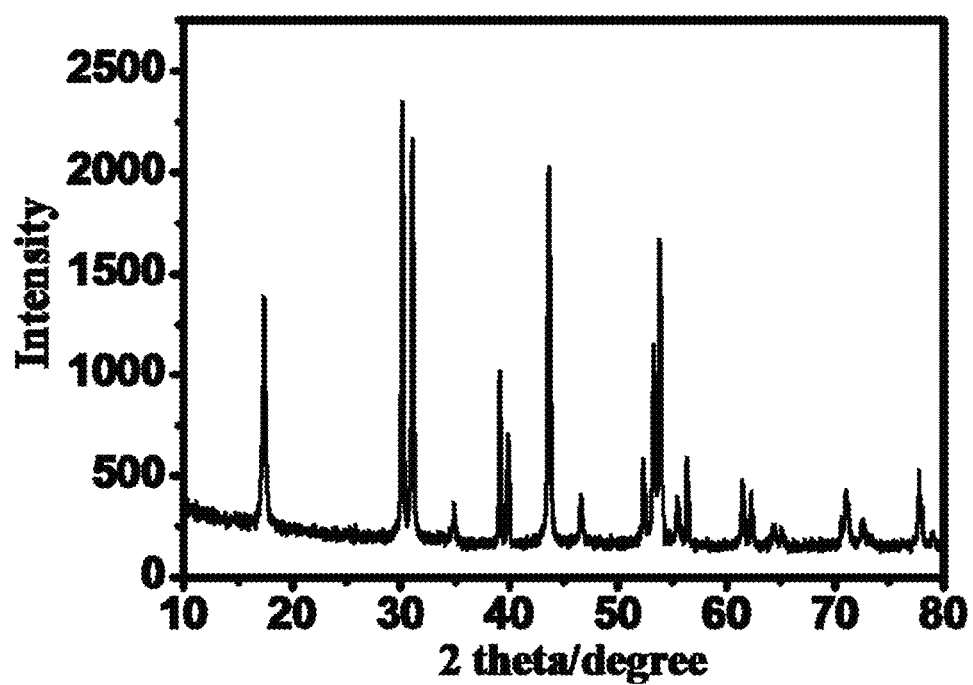
Figure: 4

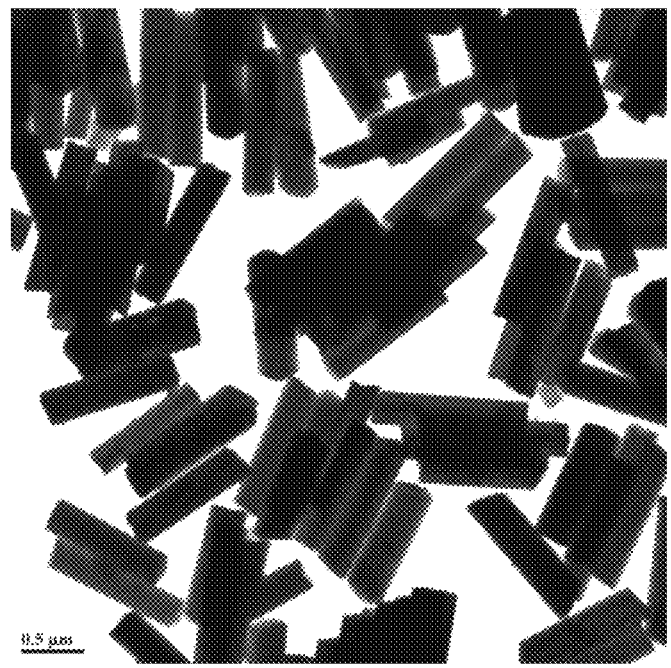
Figure: 5

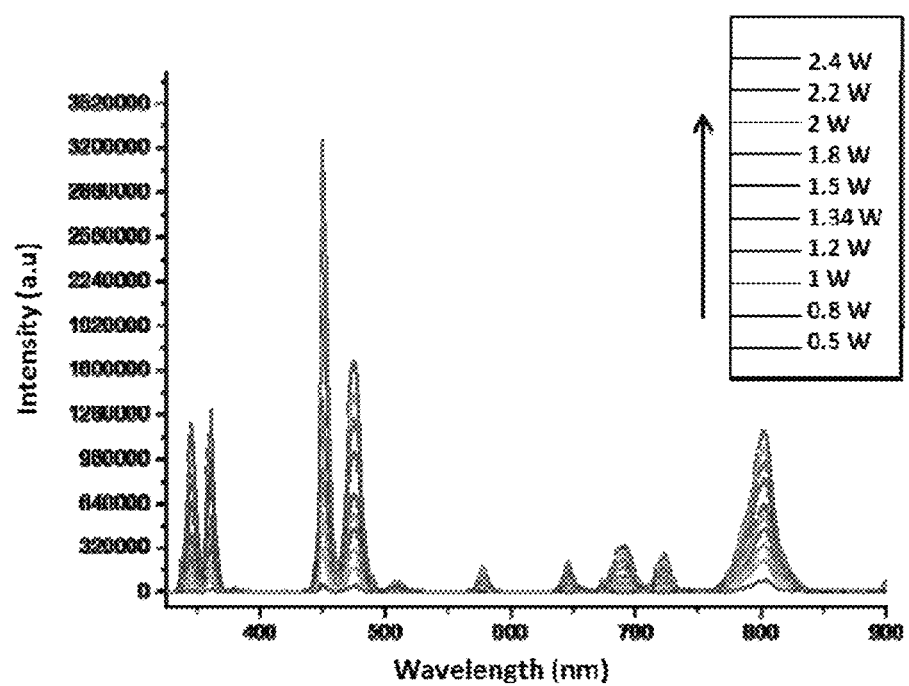
Figure: 6

N: $NaYF_4$: $Yb^{3+}$, $Er^{3+}$
C: Organic Dye
L: $NaYF_4$: $Yb^{3+}$, $Tm^{3+}$
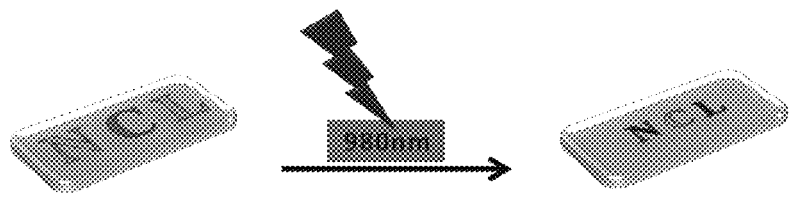
Figure: 7

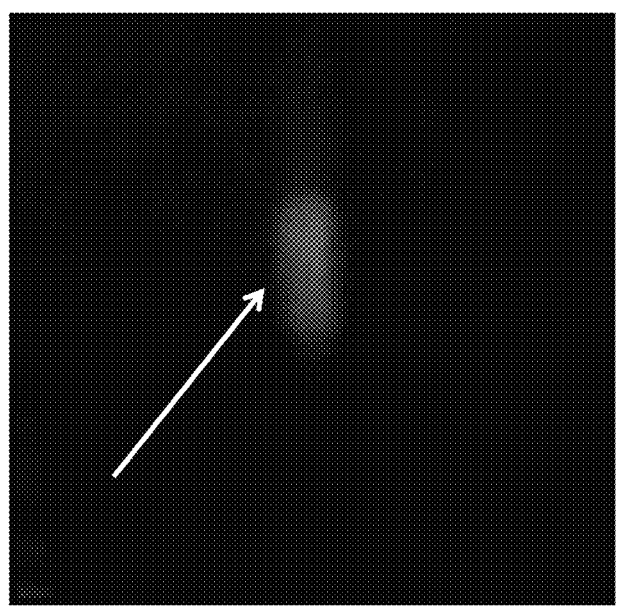
Figure: 8

LANTHANUM BASED UPCONVERTING MICRORODS AND APPLICATION THEREOF

CROSS REFERENCE TO RELATED APPLICATIONS

This application is a National Stage of International Application No. PCT/IN2017/050030, filed on Jan. 20, 2017, which claims priority to Indian patent application no. 201611002383, filed on Jan. 22, 2016, the disclosures of which are incorporated by reference in their entirety.

FIELD OF THE INVENTION

The present invention relates to a lanthanum based upconverting microrods for producing highly-resolved patterns for security tags and sensing application. More particularly, the present invention relates to a composition comprising lanthanum based upconverting microrods comprising $\beta$-NaYF$_4$:Yb$^{3+}$, Er$^{3+}$ or $\beta$-NaYF$_4$:Yb$^{3+}$, Tm$^{3+}$, embedded in polymer matrices, process for preparation thereof and use of said composition for the preparation of security tags.

BACKGROUND AND PRIOR ART OF THE INVENTION

Rare-earth ions doped luminescence upconversion nanoparticles have attracted much attention in recent years owing to their superior spectroscopic properties, mainly arising from the existence of stable intermediate states which may result in potential applications in many fields especially in biology/biomedicine. Among these materials, hexagonal-phase NaYF4 is reported as one of the most efficient hosts for performing infrared-to-visible photon conversion in the doped rare-earth ions.

Upconversion was first recognized and formulated by Auzel in the mid-1960s, which is a process where low energy light, usually near-infrared (NIR) or infrared (IR) is converted to higher energies, ultraviolet (UV) or visible, via multiple absorptions or energy transfers. Often it utilizes NIR light for the excitation and UV or VIS light will be emitted, it has several advantages over the down conversion process regarding the auto-fluorescence process and penetration length will be high. Up to now, several synthetic paths have been reported to obtain UCNPs, such as co-precipitation, hydrothermal, or solvothermal processing, liquid-solid two-phase approach, co-thermolysis of trifluoroacetate, decomposition of carbonate, diffusion-limited growth, and ionic liquid-assisted technique.

Reference is made to US 20090042314 A1, which relates to a method of preparing lanthanide-doped NaYF$_4$ nanocrystals, the method comprising: (A) providing a first solution comprising a non-coordinating solvent, a fatty acid coordinating ligand, sodium trifluoroacetate, yttrium trifluoroacetate, a first doping lanthanide trifluoroacetate and a second doping lanthanide trifluoroacetate, and a second solution comprising the non-coordinating solvent and the fatty acid coordinating ligand, the first and second solutions being substantially free of water and oxygen; (B) in an inert atmosphere, slowly adding the first solution heated at a temperature between about 100° C. and about 150° C. to the second solution heated at temperature between about 290° C. and about 330° C., thereby producing a reaction mixture containing the nanocrystals; and (C) recovering the nanocrystals from the reaction mixture. The invention also relates to lanthanide-doped uniformly shaped cubic NaYF$_4$ nanocrystals having an average particle size of at most about 50 nm with a standard deviation of at most about 15%. Finally, the invention also relates to methods of (A) identifying or authenticating a product, (B) labelling an analyte, (C) detecting an analyte, and (D) producing a light source for the telecommunication industry using the above nanocrystals.

Reference is made to PCT application no. 2015137995/ US 20140261031 A1, which discloses a system for printing patterns onto a substrate comprising: a. a near infrared (NIR)-to-visible upconverting ink, wherein the ink comprises nanocrystals that host at least two lanthanide metals, wherein the nanocrystals are capped with an organic ligand, and wherein the ink is formed by mixing the nanocrystals with a polymer in a solvent capable of dissolving the polymer; and b. wherein the ink is directly deposited onto the substrate in a predetermined pattern; c. wherein the predetermined pattern has little or no post-processing, Wherein polymer is selected from the group consisting of: polymethyl methacrylate, polyimide, polyethylene, polyester, polycarbonate, acrylonitrile butadiene styrene, polyethylene terephthalate, polyvinyl butyral, polyvinylpyrrolidone, polyamide, and polyvinyl alcohol.

Reference is made to US 20070062411 A1, which is directed toward fluorescent inks and markers comprising carbon nanotubes. The present invention is also directed toward methods of making such inks and markers and to methods of using such inks and markers, especially for security applications (e.g., anti-counterfeiting). Such inks and markers rely on the unique fluorescent properties of semiconducting carbon nanotubes.

Reference is made to article titled, "Highly Efficient Multicolour Upconversion Emission in Transparent Colloids of Lanthanide-Doped NaYF$_4$ Nanocrystals" by Heer et al. *Adv. Mater.* 2004, 16, 2102-2105 which reports highly efficient photon upconversion in solution.

Transparent colloidal solutions of Yb/Er and Yb/Tm doped NaYF$_4$ nanocrystals show bright upconversion emission in the red, green, and blue spectral region by excitation around 1 μm with a laser of moderate power. These new systems show a substantial improvement on the order of $10^8$ compared to previously reported systems.

Reference is made to article titled, "Synthesis and Upconversion Luminescence of Hexagonal-Phase NaYF$_4$Yb, Er$^{3+}$ Phosphors of Controlled Size and Morphology" by Zeng et al. in Adv. Mater. 2005, 17, 2119-2123 which reports that green upconversion emission from hexagonal-phase NaYF$_4$Yb, Er$^{3+}$ phosphors can be directly observed with the naked eye. Powders with controlled size and morphology can be synthesized in ethanol and show a minimal decrease in luminescence intensity after 24 h.

Reference is made to article titled, "Enhanced blue and green upconversion in hydrothermally synthesized hexagonal NaY$_{1-x}$YB$_x$F$_4$:Ln$^{3+}$ (Ln$^{3+}$=Er$^{3+}$ or Tm$^{3+}$)" by Lifang Liang Hao Wu, Haili Hu, Mingmei Wu, Qiang Su in Journal of Alloys and Compounds, Volume 368, Issues 1-2, 14 Apr. 2004, Pages 94-100 which reports Hexagonal NaY$_{1-x}$Yb$_x$F$_4$: Ln$^{3+}$ (x=0.05-1.00, Ln$^{3+}$=Er$^{3+}$ or Tm$^{3+}$) preparation through hydrothermal synthesis. The concentration of doped rare earth and pumping power on the upconversion emissions have been extensively investigated under 980 nm excitation.

Reference is made to article titled, "A Strategy for Simultaneously Realizing the Cubic-to-Hexagonal Phase Transition and Controlling the Small Size of NaYF$_4$:Yb$^{3+}$,Er$^{3+}$ Nanocrystals for In Vitro Cell Imaging" by Chan et al. in Small, 2012, 8, 1863-1868 which reports Hexagonal-phase NaYF$_4$:Yb$^{3+}$,Er$^{3+}$ up-conversion nanocrystals (UCNCs) by a combination of refluxing and hydrothermal treatment. This strategy leads to only a slight increase in particle size, from 4.5 to ca. 10 nm, during the cubic-to-hexagonal phase transition. The hexagonal UCNCs can be internalized by HeLa cells and exhibit visible emission in the cells under near-infrared excitation.

Reference is made to article titled, "La(OH)3:Ln3+ and La2O3:Ln3+ (Ln=Yb/Er, Yb/Tm, Yb/Ho) Microrods: Synthesis and Up-conversion Luminescence Properties" by Xiao Zhang, Piaoping Yang, Dong Wang, Jie Xu, Chunxia Li, Shili Gai, and Jun Lin in *Cryst. Growth Des.*, 2012, 12 (1), pp 306-312 which reports multicolor up-conversion luminescent $RE^{3+}$ doped $La(OH)_3$ and $La_2O_3$ microrods fabrication through a facile composite hydroxide mediated route. Furthermore, the uniform $La_2O_3:Er^{3+}$ microrods shows a nearly twice emission intensity to that of the bulk counterpart, suggesting a promising potential in various colour displays.

Reference is made to article titled, "Preparation and characterization of oil-soluble LaF3 nanoparticles" by Li Nan, Mai Rongshun in Guangdong Chemical Industry, Year 2009, Issue. 6, Page 56-57, 255 which reports oleic acid and sodium fluoride as the main raw material of lanthanum, LaF3 nanoparticles modified by lanthanum oleate preparation in a two-phase system of toluene and water. The obtained LaF3 nanoparticles were characterized by transmission electron microscopy, infrared spectroscopy, X-ray photoelectron spectroscopy and other modern analytical methods The results showed that LaF3 nano-particles modified with LaO3 nanoparticles were uniform in size and about 10 nm in size, and LaF3 nano-particles were modified by the chemical bonding between the surface modifier lanthanum oleate and LaF3 nanoparticles. The dispersibility of the particles in the low polar organic solvent is obviously improved.

Reference is made to article titled, "Probing the nature of upconversion nanocrystals: instrumentation matters" by Xiaowang Liu, Renren Deng, Yuhai Zhang, Yu Wang, Hongjin Chang, Ling Huang and Xiaogang Liu in *Chem. Soc. Rev.*, 2015, 44, 1479-1508 which reports an overview of the instrumentation techniques commonly utilized for the characterization of upconversion nanocrystals. A considerable emphasis is placed on the analytical tools for probing the optical properties of the luminescent nanocrystals. The advantages and limitations of each analytical technique are compared in an effort to provide a general guideline, allowing optimal conditions to be employed for the characterization of such nanocrystals. Parallel efforts are devoted to new strategies that utilize a combination of advanced emerging tools to characterize such nanosized phosphors.

However, there remains a need for microcrystals or microrods, more particularly $NaYF_4$ microcrystals or microrods, that have improved physical characteristics and optical properties over that described in the prior art.

Reference is also made to US 20090042314 A1 which relates to a method of preparing lanthanide-doped $NaYF_4$ nanocrystals, the method comprising: (A) providing a first solution comprising a non-coordinating solvent, a fatty acid coordinating ligand, sodium trifluoroacetate, yttrium trifluoroacetate, a first doping lanthanide trifluoroacetate and a second doping lanthanide trifluoroacetate, and a second solution comprising the non-coordinating solvent and the fatty acid coordinating ligand, the first and second solutions being substantially free of water and oxygen; (B) in an inert atmosphere, slowly adding the first solution heated at a temperature between about 100° C. and about 150° C. to the second solution heated at temperature between about 290° C. and about 330° C., thereby producing a reaction mixture containing the nanocrystals; and (C) recovering the nanocrystals from the reaction mixture. The invention also relates to lanthanide-doped uniformly shaped cubic $NaYF_4$ nanocrystals having an average particle size of at most about 50 nm with a standard deviation of at most about 15%. Finally, the invention also relates to methods of (A) identifying or authenticating a product, (B) labelling an analyte, (C) detecting an analyte, and (D) producing a light source for the telecommunication industry using the above nanocrystals.

But, the present invention provides a method for preparing micro rods with high aspect ratio without addition of rare earth metal salts (like $Gd^{3+}$,etc.)

OBJECTS OF THE INVENTION

The main objective of the present invention is to provide a monodispersed lanthanum based upconverting microrods for use in security tags and sensing application.

Another objective of the present invention is to provide a process for the preparation of monodispersed lanthanum based upconverting microrods, capped with oleic acid.

Yet another objective of the present invention is to provide a composition comprising lanthanum based upconverting microrods embedded in polymer matrices.

Still another objective of the present invention is to provide a composition comprising lanthanum based upconverting microrods, comprising $\beta$-$NaYF_4$:$Yb^{3+}$, $Er^{3+}$ or $\beta$-$NaYF_4Yb^{3+}$, $Tm^{3+}$, capped with oleic acid, embedded in polymer matrices for making a security tags that may respond to different excitation wave lengths.

SUMMARY OF THE INVENTION

Accordingly, the present invention provides a monodispersed lanthanum based upconverting microrods for making a security tags.

In an embodiment, the monodispersed lanthanum based upconverting microrods is selected from $\beta$-$NaYF_4$:$Yb^{3+}$, $Er^{3+}$ and $\beta$-$NaYF_4$:$Yb^{3+}$, $Tm^{3+}$, capped with oleic acid, for making security tags and for sensing application.

In another embodiment, the microrods are having length in the range of 100 to 350 nm and the width is in the range of 10 to 15 nm.

Further, in the preferred embodiment, the microrods selected from $\beta$-$NaYF_4$:Yb3+, Er3+ and $\beta$—$NaYF_4$Yb3+, Tm3+ are of length 120.257 nm and 418.1457 nm and width 12.5412 nm and 83.9962 nm respectively.

In another embodiment, the microrods, $\beta$—$NaYF_4$:$Yb^{3+}$, $Er^{3+}$ comprising $\beta$—$NaYF_4$:$Yb^{3+}$ and $Er^{3+}$ have a ratio in the range of 6 to 12.

In yet another embodiment, the microrods, $\beta$—$NaYF_4$: $Yb^{3+}$, $Tm^{3+}$ comprising $\beta$—$NaYF_4$:$Yb^{3+}$ and $Tm^{3+}$ have a ratio in the range of 3 to 7.

Also, the present invention provides a process for the preparation of oleate-capped lanthanum based upconverting microrods, comprising the steps of:
  a. mixing oleic acid, sodium hydroxide, absolute ethanol and water;
  b. adding a solution containing a mixture of lanthanum compounds and sodium fluoride to reaction mixture of step (a);
  c. refluxing the reaction mixture of step (b) for the period in the range of 4 to 6 hrs at temperature in the range of 160 to 180° C. and allowed to cool at room temperature;
  d. heating the reaction mixture of step (c) for the period in the range of 50 to 60 hrs at temperature in the range of 180 to 195° C. under nitrogen atmosphere, followed by drying to afford oleate-capped lanthanum based upconverting microrods.

In another embodiment, the process wherein the mixture of lanthanum compound of step (b) contains Yttrium(III) chloride hexahydrate ($YCl_3.6H_2O$), Ytterbium(III) Chloride Hexahydrate ($YbCl_3.6H_2O$) and Erbium(III) chloride hexahydrate ($ErCl_3.6H_2O$).

In another embodiment, the oleate-capped lanthanum based upconverting microrods, are embedded in polymer matrices for making security tags that responds to different wavelengths and for sensing application.

In yet another embodiment, the oleate-capped lanthanum based upconverting microrods embedded in polymer matrices, wherein the polymer matrices used is selected from polydimethylsiloxane (PDMS), Ethylene propylene diene monomer (EPDM), Polyethylene oxide (PEO), Polystyrene (PS) and natural silk scaffold.

LIST OF ABBREVIATIONS

UCNP—Upconversion nanoparticles
UCMR—Upconversion micro rods
NIR—Near-infrared radiation
$NaYF_4$—sodium yttrium tetra-fluoride
Er—Erbium
Yb—Ytterbium
Tm—Thulium

BRIEF DESCRIPTION OF THE DRAWINGS

FIG. 1: Powder X-ray powder diffraction (XRD) of $\beta$-$NaYF_4$:$Yb^{3+}$, $Er^{3+}$ UCMR.

FIG. 2: TEM image of $\beta$-$NaYF_4$:$Yb^{3+}$, $Er^{3+}$ UCMR.

FIG. 3: Emission spectrum of $\beta$-$NaYF_4$:$Yb^{3+}$, $Er^{3+}$ microrods in PDMS film (1% of UCMR).

FIG. 4: Powder XRD of $\beta$-$NaYF_4$:$Yb^{3+}$, $Tm^{3+}$ UCMR.

FIG. 5: TEM image of $\beta$-$NaYF4$:$Yb^{3+}$, $Tm^{3+}$ UCMR.

FIG. 6: Emission spectrum of $\beta$-$NaYF_4$$Yb^{3+}$, $Tm^{3+}$ microrods in PDMS film (1% of UCMR).

FIG. 7: UCNP embedded PDMS film (The letter 'N' was made with $NaYF_4$ (Er/Yb) (which emits green under NIR radiation), 'C' was made with an organic dye and 'L' was made with $NaYF_4$ (Tm/Yb)(which emits blue under NIR radiation).

FIG. 8: UCNP ($NaYF_4$ (Er/Yb) embedded polypropylene fibre that shows visibly the green color under NIR light (the above image was taken without the NIR filter and hence it is white in color).

DETAILED DESCRIPTION OF THE INVENTION

The invention will now be described in detail in connection with certain preferred and optional embodiments, so that various aspects thereof may be more fully understood and appreciated.

In view of above, the present invention provides a monodispersed lanthanum based upconverting microrods for making a security tags.

In view of above, the present invention further provides a composition comprising lanthanum based upconverting microrods embedded in polymer matrices, process for preparation thereof and use of said composition for the preparation of security tags.

In an embodiment, the present invention provides a mono dispersed lanthanum based upconverting microrods for use in security tags and sensing application.

In preferred embodiment, said mono dispersed lanthanum based upconverting microrods are capped with oleic acid.

In another preferred embodiment, said oleate-capped mono dispersed lanthanum based upconverting microrods are selected from $\beta$-$NaYF_4$:$Yb^{3+}$, $Er^{3+}$ or $\beta$-$NaYF_4$:$Yb^{3+}$, $Tm^{3+}$.

In yet another preferred embodiment, the length of the microrods $\beta$-$NaYF_4$:$Yb^{3+}$, $Er^{3+}$ and $\beta$-$NaYF_4$:$Yb^{3+}$, $Tm^{3+}$ is 120.257 nm and 418.1457 nm respectively.

In still another preferred embodiment, the width of the microrods $\beta$-$NaYF_4$:$Yb^{3+}$, $Er^{3+}$ and $\beta$-$NaYF_4$:$Yb^{3+}$, $Tm^{3+}$ is 12.5412 nm and 83.9962 nm respectively In another preferred embodiment, the aspect ratio of said microrods $\beta$—$NaYF4$:$Yb^{3+}$, $Er^{3+}$ is in the range of 6 to 12.

In yet another preferred embodiment, the aspect ratio of said microrods $\beta$—$NaYF_4$:$Yb^{3+}$, $Tm^{3+}$ is in the range of 3 to 7.

In another embodiment, the present invention provides a process for the preparation of oleate-capped lanthanum based upconverting microrods, wherein said process comprising the steps of:
  a) mixing oleic acid, sodium hydroxide, absolute ethanol and water;
  b) adding a solution containing a mixture of lanthanum compounds and sodium fluoride (NaF) to reaction mixture of step (a);
  c) refluxing the reaction mixture of step (b) for the period in the range of 4 to 6 hrs at temperature in the range of 160 to 180° C. and allowed to cool at room temperature;
  d) heating the reaction mixture of step (c) for the period in the range of 50 to 60 hrs at temperature in the range of 180 to 195° C. followed by drying to afford oleate-capped lanthanum based upconverting microrods.

In a preferred embodiment, said reflux in step (c) is carried out under nitrogen atmosphere.

In another preferred embodiment, said mixture of lanthanum compound in step (b) contains Yttrium(III) chloride hexahydrate ($YCl_3.6H_2O$), Ytterbium(III) Chloride Hexahydrate ($YbCl_3.6H_2O$) and Erbium(III) chloride hexahydrate ($ErCl_3.6H_2O$).

In yet another preferred embodiment, said mixture of lanthanum compound in step (b) contains Yttrium(III) chloride hexahydrate ($YCl_3.6H_2O$), Ytterbium(III) Chloride Hexahydrate ($YbCl_3.6H_2O$) and Thulium(III) Chloride Hexahydrate ($TmCl_3.6H_2O$).

In still another preferred embodiment, said oleate-capped lanthanum based upconverting microrods are selected from $\beta$-$NaYF_4$:$Yb^{3+}$, $Er^{3+}$ or $\beta$-$NaYF_4$:$Yb^{3+}$, $Tm^{3+}$.

In yet another preferred embodiment, the present invention provides a composition comprising oleate-capped lanthanum based upconverting microrods embedded in polymer matrices.

In a preferred embodiment, said polymer matrices is selected from polydimethylsiloxane (PDMS), Ethylene propylene diene monomer (EPDM), Polyethylene oxide (PEO), Polystyrene (PS) and natural silk scaffold.

In another preferred embodiment, the composition is in the form of microrods, nanocrystal and their composites in polymer matrices and conjugation with different organic dye molecules for energy transfer processes that could be useful for sensing application.

In yet another preferred embodiment, said oleate-capped lanthanum based upconverting microrods are selected from β-NaYF$_4$:Yb$^{3+}$, Er$^{3+}$ or β-NaYF$_4$:Yb$^{3+}$, Tm$^{3+}$.

In still another embodiment, the present invention provides a composition comprising oleate-capped lanthanum based upconverting microrods embedded in polymer matrices for making a security tags that may respond to different excitation wave lengths and are may be useful for sensing application.

Tm/Yb and Er/Yb doped microrods are utilized to create a pattern on PDMS film and the result is provided in FIG. 7. These microrods can be embedded into polymeric fibre efficiently (polypropylene fibre) and the emission features can be visualized (FIG. 7).

A very small amount of UCNP is melt compounded into polypropylene, a thermoplastic fibre forming polymer, using a DSM twin screw microcompounder and successfully extruded into fibres of 25-30 micron diameter. UCNPs are found to be thermally stable under polymer melt-processing conditions and retained their function (FIG. 8).

EXAMPLES

Following examples are given by way of illustration therefore should not be construed to limit the scope of the invention.

Example 1

Synthesis of Oleate-Capped β-NaYF$_4$: Yb$^{3+}$, Er$^{3+}$

In a 100 mL two-neck round-bottom flask equipped with a water-cooled condenser, oleic acid (20 mL), sodium hydroxide (1.16 g), absolute ethanol (7 mL) and DI water (9 mL) were mixed together, to which an aqueous solution of 7 mL containing YCl$_3$.6H$_2$O, YbCl$_3$.6H$_2$O, ErCl$_3$.6H$_2$O (1 mmol in total, molar ratio 78:20:2) and NaF (5 mmol) were added under vigorous stirring. The reaction mixture was heated to boiling and refluxed for 6 h at 180° C. under N$_2$ gas atm. Then solution was cooled to room temperature transferred into a Teflon bottle (100 mL) held in a stainless steel autoclave. It was sealed and hydrothermally heated at 195° C. for 60 h. After complete the reaction cooled to room temperature. 20 mL of absolute ethanol was added before and after hydrothermal treatment. Then the precipitate was separated by using centrifuged 10,000 rpm in 10 mins and washed with absolute ethanol (three times). Then the precipitate was dried in oven for 4 h.

FIG. 1 shows Powder X-ray powder diffraction (XRD) of β-NaYF$_4$:Yb$^{3+}$, Er$^{3+}$ UCMR.

FIG. 2 shows TEM image of β-NaYF$_4$:Yb$^{3+}$, Er$^{3+}$ UCMR.

FIG. 3 shows Emission spectrum of β-NaYF$_4$:Yb$^{3+}$, Er$^{3+}$ microrods in PDMS film (1% of UCMR).

Example 2

Synthesis of Oleate-Capped β-NaYF$_4$:Yb$^{3+}$, Tm$^{3+}$

In a 100 mL two-neck round-bottom flask equipped with a water-cooled condenser, oleic acid (20 mL), sodium hydroxide (1.16 g), absolute ethanol (7 mL) and DI water (9 mL) were mixed together, to which an aqueous solution of 7 mL containing YCl$_3$.6H$_2$O, TmCl$_3$.6H$_2$O (1 mmol in total, molar ratio 75:25:0.003) and NaF (5 mmol) were added under vigorous stirring. The reaction mixture was heated to boiling and refluxed for 6 h at 180° C. under N$_2$ gas atm. Then solution was cooled to room temperature transferred into a Teflon bottle (100 mL) held in a stainless steel autoclave. It was sealed and hydrothermally heated at 195° C. for 60 h. After complete the reaction cooled to room temperature. 20 mL of absolute ethanol was added before and after hydrothermal treatment. Then the precipitate was separated by using centrifuged 10,000 rpm in 10 mins and washed with absolute ethanol (three times). Then the precipitate was dried in oven for 4 h.

FIG. 4 shows Powder XRD of β-NaYF$_4$:Yb$^{3+}$, Tm$^{3+}$ UCMR.

FIG. 5 shows TEM image of β-NaYF$_4$:Yb$^{3+}$, Tm$^{3+}$ UCMR.

FIG. 6 shows Emission spectrum of β-NaYF$_4$:Yb$^{3+}$, Tm$^{3+}$ microrods in PDMS film (1% of UCMR).

Example 3

Aspect Ratio of Said Micro Rods

The aspect ratios of said micro rods are summarized in table 1.

TABLE 1

| β-NaYF$_4$:Yb$^{3+}$, Er$^{3+}$ | β-NaYF$_4$:Yb$^{3+}$, Tm$^{3+}$ |
|---|---|
| 8.7249 | 3.4794 |
| 7.6638 | 6.2082 |
| 11.5339 | 4.0016 |
| 8.1962 | 3.8283 |
| 8.0068 | 5.2400 |
| 8.9785 | 5.3537 |
| 9.0285 | 5.3591 |
| 9.3364 | 5.6863 |
| 9.9895 | 5.6188 |
| 9.7580 | 5.9735 |

Example 4

PDMS Film Containing UCMR 1 mg of UCNPs (NaYF$_4$: Yb$^{3+}$, Er$^{3+}$/Tm$^{3+}$) were dissolved in 1 mL of cyclohexane.

1 mg of organic dye dissolved in 1 mL of dichloromethane. Then made mixture of 2 g PDMS elastomer base (Sylgard 184) and PDMS curing agent (DC184A, weight ratio=10:1). After gentle shaking for 5 mins, the mixture was poured into a plastic petridish (2 cm×4.5 cm; diameter: 0.5 cm) and cured at 70° C. for 2 h to get a colorless film (thickness: 2.5 mm). The thickness of the film can be controlled by choosing a proper size of the dish. On top of the PDMS polymer wrote three letters N C L by using capillary tube for understanding change in colour of letters after exposure of NIR light (980 nm). The letter N belongs to NaYF$_4$: Yb$^{3+}$, Er$^{3+}$, letter C belongs to organic dye and letter L belongs to NaYF$_4$: Yb$^{3+}$, Tm$^{3+}$.

ADVANTAGES OF THE INVENTION a) Microrods for making a security tags.
b) Surface functionalization with different dyes are possible for an efficient energy transfer purpose that could be useful for sensing application due to high efficient up-conversion process with microrods.

We claim:
1. A monodispersed lanthanum based upconverting microrods selected from β-NaYF$_4$:Yb$^{3+}$, Er$^{3+}$ and β-NaYF$_4$:

$Yb^{3+}$, $Tm^{3+}$, capped with an organic ligand consisting of oleic acid, for making security tags and for sensing applications, wherein the β-NaYF$_4$:Yb$^{3+}$, Er$^{3+}$ comprises β-NaYF$_4$:Yb$^{3+}$ and Er$^{3+}$ but not Gd$^{3+}$ and has an aspect ratio in the range of 6 to 12, or wherein the β-NaYF$_4$:Yb$^{3+}$, Tm' comprises β-NaYF$_4$:Yb$^{3+}$ and Tm$^{3+}$ but not Gd$^{3+}$ and has an aspect ratio in the range of 3 to 7, and wherein the microrods selected from β-NaYF$_4$:Yb$^{3+}$, Er$^{3+}$ and β-NaYF$_4$:Yb$^{3+}$, Tm$^{3+}$ have a length of 120.257 nm and 418.1457 nm respectively, and a width of 12.5412 nm and 83.9962 nm respectively.

2. A process for the preparation of monodispersed lanthanum based upconverting microrods selected from β-NaYF$_4$:Yb$^{3+}$, Er$^{3+}$ and β-NaYF$_4$:Yb$^{3+}$, Tm$^{3+}$, capped with an organic ligand consisting of oleic acid, for making security tags and for sensing applications, where the β-NaYF$_4$:Yb$^{3+}$, Er$^{3+}$ comprises β-NaYF$_4$:Yb$^{3+}$ and Er$^{3+}$ but not Gd$^{3+}$ and has an aspect ratio in the range of 6 to 12, or wherein the β-NaYF$_4$:Yb$^{3+}$, Tm$^{3+}$ comprises β-NaYF$_4$:Yb$^{3+}$ and Tm$^{3+}$ but not Gd$^{3+}$ and has an aspect ratio in the range of 3 to 7 the process comprising the steps of:

a. mixing oleic acid, sodium hydroxide, absolute ethanol and water;

b. adding a solution containing a mixture of lanthanum compounds and sodium fluoride to a reaction mixture of step (a);

c. refluxing the reaction mixture of step (b) for a period in the range of 4 to 6 hrs at a temperature in the range of 160 to 180° C. and allowed to cool at room temperature; and d. heating the reaction mixture of step (c) for a period in the range of 50 to 60 hrs at a temperature in the range of 180 to 195° C., under nitrogen atmosphere, followed by drying to afford the oleate-capped lanthanum based upconverting microrods.

3. The process as claimed in claim 2, wherein the mixture of the lanthanum compounds of step (b) contains Yttrium (III) chloride hexahydrate (YCl$_3$.6H$_2$O), Ytterbium(III) Chloride Hexahydrate (YbCl$_3$.6H$_2$O) and Erbium(III) chloride hexahydrate (ErCl$_3$.6H$_2$O).

4. The process as claimed in claim 2, wherein the oleate-capped lanthanum based upconverting microrods are embedded in polymer matrices for making security tags that respond to different wavelengths and for sensing applications.

5. The process as claimed in claim 4, wherein the polymer matrices are selected from polydimethylsiloxane (PDMS), Ethylene propylene diene monomer (EPDM), Polyethylene oxide (PEO), Polystyrene (PS) and a natural silk scaffold.

* * * * *